Figure 1:
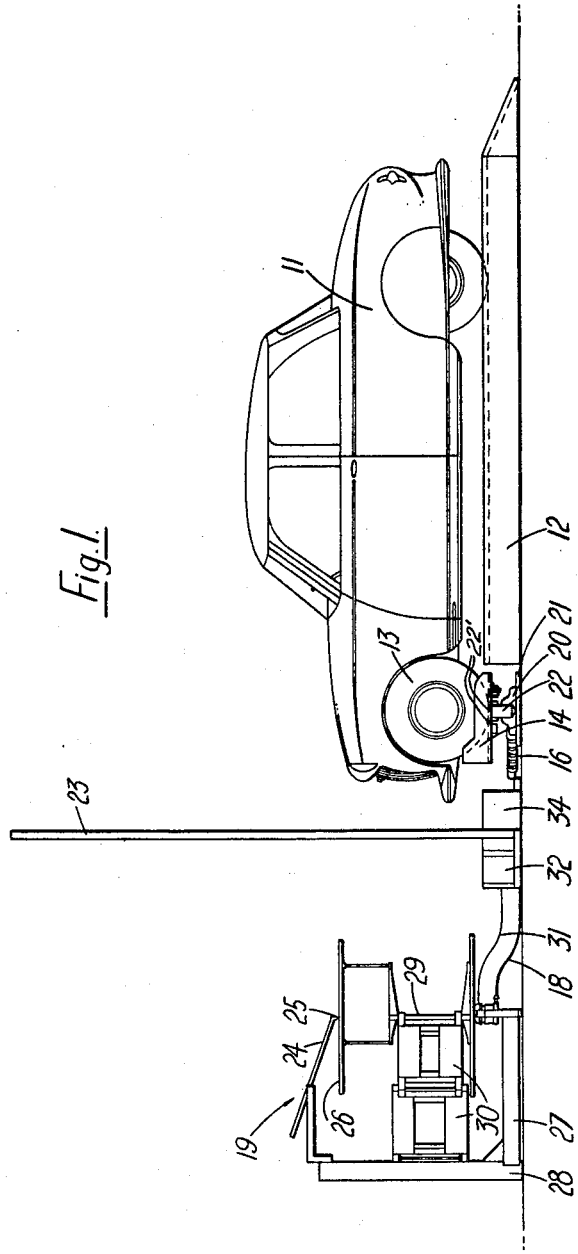

Oct. 22, 1963   R. LARLHAM ETAL   3,107,437
DRIVING TRAINING DEVICES

Filed March 9, 1961   4 Sheets-Sheet 2

Inventors
ROY LARLHAM
GERALD ROBERT STEVENS
By Bacon & Thomas
Attorneys

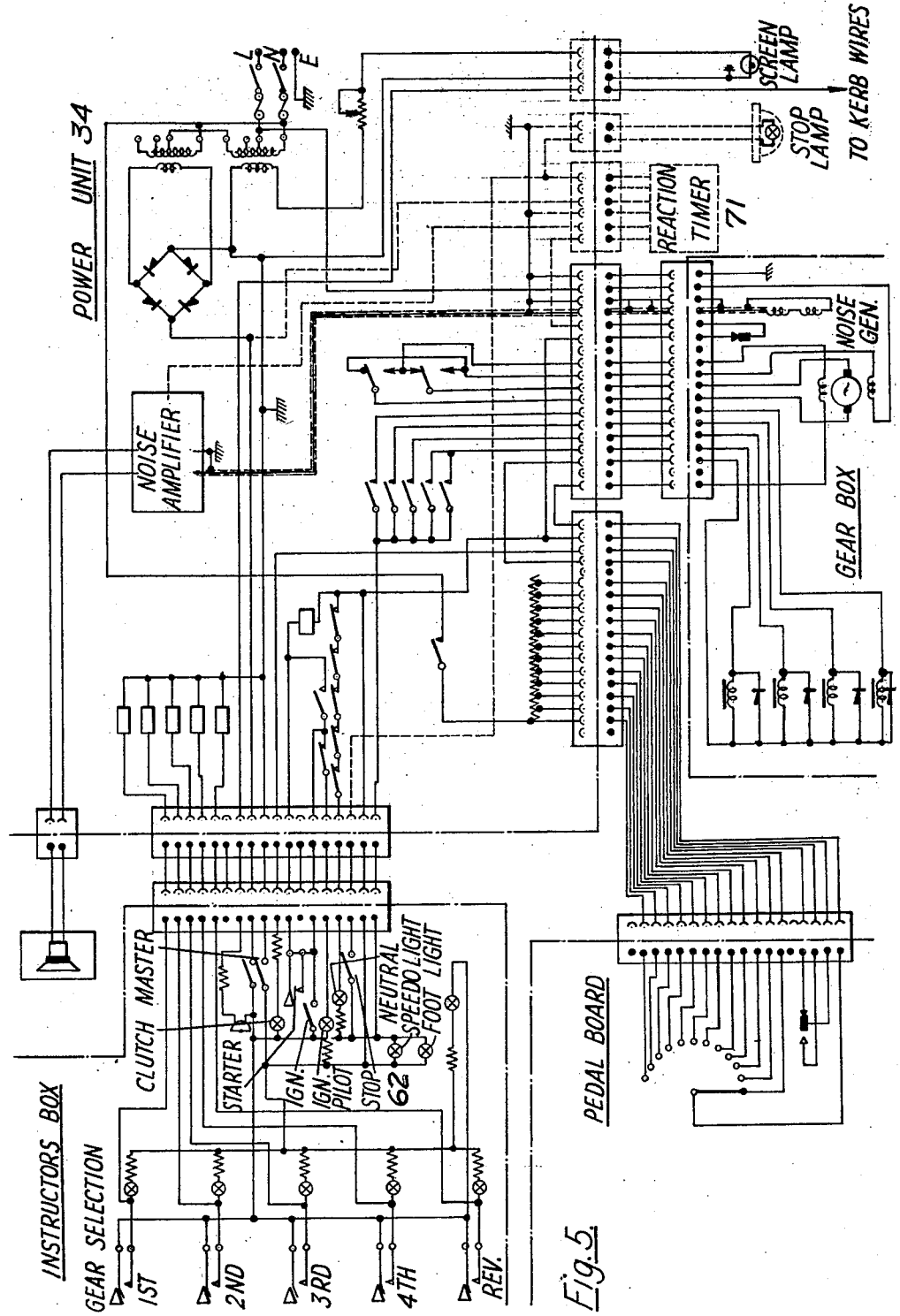

3,107,437
DRIVING TRAINING DEVICES
Roy Larlham, Aylesbury, and Gerald Robert Stevens, Wendover, England, assignors to General Precision Systems Limited, Aylesbury, England
Filed Mar. 9, 1961, Ser. No. 94,495
Claims priority, application Great Britain Mar. 10, 1960
14 Claims. (Cl. 35—11)

This invention relates to training devices for presenting, to a pupil driver seated in a stationary body provided with motor vehicle controls, a visual picture of terrain through which he is supposed to be moving and which behaves appropriately in response to his handling of the controls, so that he can choose his own course and speed.

An example of such a device is described in British patent specification No. 431,049; the present invention is not however restricted thereto in its application or to the particular means there shown for producing the visual illusion.

It is a primary object of the present invention to provide, in such an equipment, means whereby the visual illusion apparatus can be readily and realistically operated from a real vehicle, for example the motorcar owned by an individual trainee, rather than from a special or simulated car body constructed for this purpose.

According to one aspect of the invention, at least one wheel-supporting shoe or turntable is provided that receives a steerable wheel of the vehicle and is mounted for turning with the wheel about an upright pivot when the vehicle steering is operated, the angular movements of the shoe representing steering deflection angle information that is transmitted to the visual illusion apparatus. There can be two such shoes to receive the two front wheels of the vehicle, at least one shoe being spring-biassed towards the "straight ahead" position in a simulation of the self-centering tendency of the steering of a car in motion.

To cater to a variety of cars, the shoes can be mounted to turn on bases that are movable toward and away from one another to vary the separation between the shoe pivot axes. Each shoe may also be adjustable laterally in position with respect to its pivot axis.

According to an other aspect of the invention, control signal information for controlling the illusion apparatus is derived in part directly from the movements of the vehicle controls made by the pupil and in part from an instructor's control unit having controls operable by a human instructor keeping the pupil's actions under observation.

Thus, there can be means to pick off appropriate signals from the foot controls of the car, without impeding their operation or being otherwise distracting to the pupil, and controls on the instructor's control unit by the use of which the instructor can select gear ratios in a simulated gear box in accordance with his observations of the pupil's use of the gear lever and clutch.

Preferably, the foot control signal pick-off means comprises nested coaxial tubes of different length each with a radial arm to bear on a different one of the vehicle control pedals.

Figure 2:
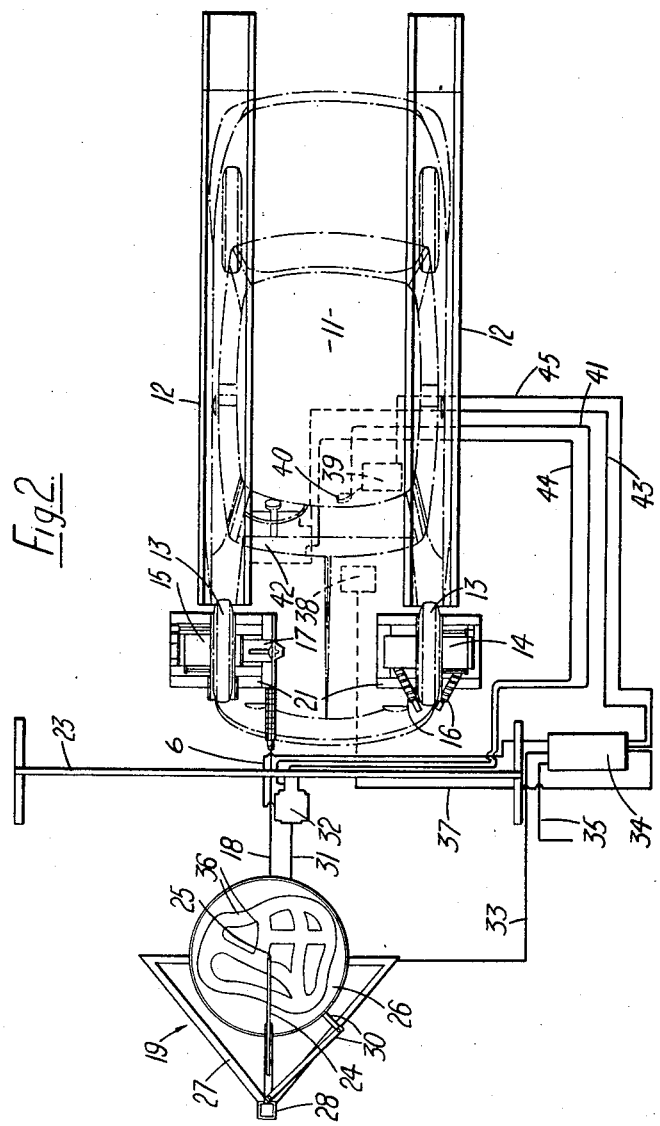
Figure 3:
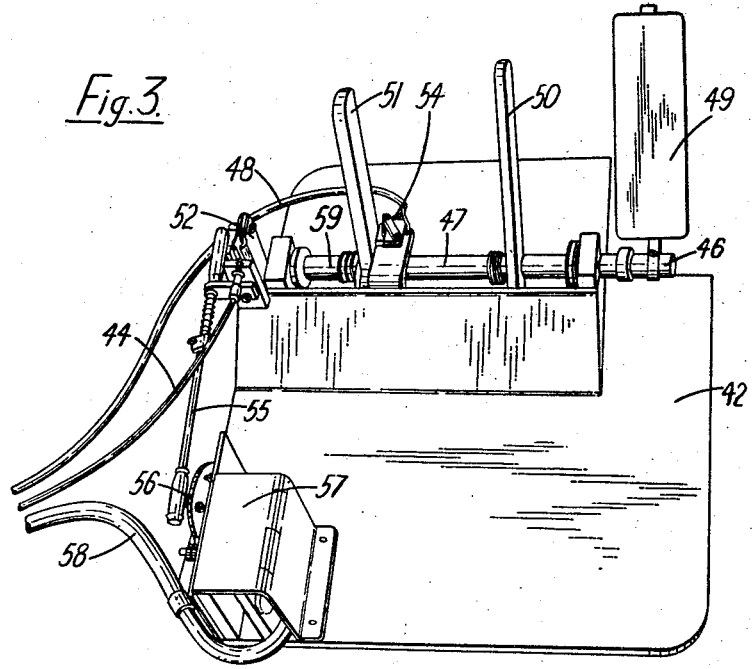
Figure 4:
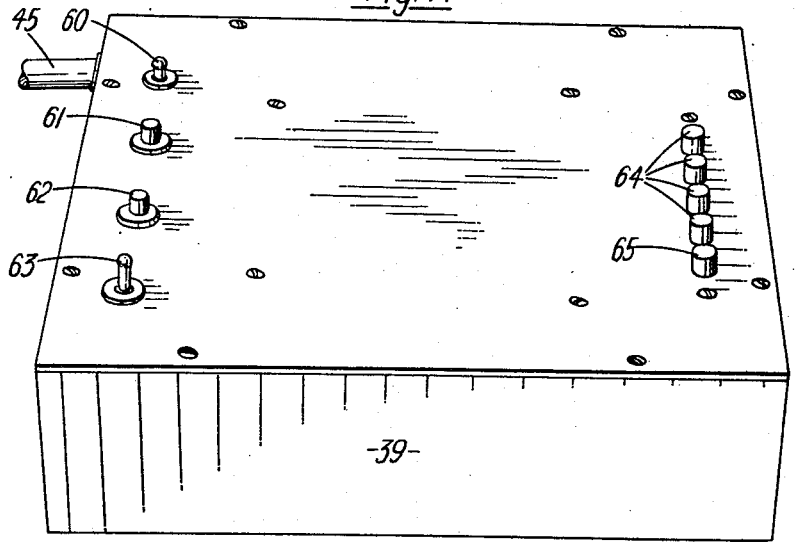

These and other features of the invention will be apparent in the embodiment thereof now to be described by way of example, reference being had to the accompanying drawings in which:

FIGURE 1 is a diagrammatic elevation of a car driving trainer in accordance with the invention, FIGURE 2 is a diagrammatic plan of the trainer, FIGURE 3 is a pictorial view of part of the trainer equipment for use in association with the control pedals of a car, FIGURE 4 is a pictorial view of an instructor's control box forming part of the trainer equipment, and FIGURE 5 is a diagram of the electrical circuitry of the trainer.

In the use of the equipment shown in the drawings a motor car 11 is run up on to a pair of ramps 12 and driven forward until its front wheels 13 rest in a pair of shoes 14, 15. These shoes are able to turn about upright pivot pins when the car steering is operated. The nearside shoe 14 is loaded by springs 16 to bias the wheels towards the "straight ahead" position in simulation of the self-centering tendency of the steering of a car in motion. The offside shoe 15 has an arm 17 for connection of a mechanical take-off sheathed cable 18 transmitting steering angle information to visual illusion apparatus 19. Friction damping of the shoes, and also the spring force, can be adjusted to suit the normal steering "feel" and characteristics of the particular car in use.

The shoes 14, 15 are carried by rotary heads 22 borne on pivot pins which are in turn received in bearing members 20 mounted on baseboards 21. The shoes 14, 15 are mounted on slides 22' on the bottom of the shoes so as to be each adjustable in position across their respective rotary heads 22 and hence with respect to their pivot pins. This adjustment is to take account of the fact that in many cars the points at which the steering king pin axes intersect the road surface do not coincide with the areas at which the tires contact the road. Were this factor not allowed for, turning the steering when the present equipment is in use would cause an undesirable shift of the front of the car.

The shoes 14, 15 embody stops for the front wheels of the car and these are adjustable in position so that the wheels of different cars can be set correctly in the fore-and-aft direction with respect to the shoe pivots.

Before the car is driven into position the stops are correctly set, and the two shoe assemblies are so spaced apart that the distance between their pivot axes corresponds to the known spacing, in respect to that car, between the points at which its king pin axes intersect the road. The shoes themselves are, if necessary, adjusted symmetrically towards or away from one another until they have the mutual spacing for accommodating the two front tires of the car. These adjustments will normally be made by reference to graduated markings on the shoe assembly parts.

The visual illusion is produced on a translucent screen 23 in front of the car 11 by the apparatus 19 behind the screen. This apparatus is broadly of the kind described in British patent specification No. 431,049. It comprises a landscape and road model on a horizontal disc 26 which can be both rotated on a shaft 29 and traversed across a stationary frame 27 while supported by pivotally-connected links 30. The disc is made of transparent plastic material and is painted with special inks to form a model road layout, with upstanding silhouette models of trees, hedges, fences, telegraph poles, road signs, and so forth, added as desired. Models of vehicles can also be placed on the disc. A small projection lamp 25, that is in a housing open only on the side facing the back of the screen 23, rests on the disc at a position fixed relatively to the stationary frame 27, the lamp being carried by a boom 24 extending from the upper end of an upright backpost 28 of this frame. The lamp position on the surface of the disc 26 represents the viewing position of the pupil driver in the car. The upstanding silhouette models and model vehicles on the disc can be arranged to fall flat or be pushed aside if encountered by the lamp as the disc moves.

The combined traverse and rotary motions of the disc 26 and its shaft 29 are brought about through the aforementioned cable 18, transmitting the steering angle information from the front wheels of the actual car, and a further cable 31 transmitting drive from an electric motor and simulated gearbox unit 32. This motor unit 32 simulates the engine, clutch, gearbox and brakes of the car 11, under the control of, on the one hand, movements made by the pupil driver in operation of the actual control pedals of the car and, on the other hand, the operation by an instructor seated beside the pupil of an instructor's control box 39.

The equipment includes a power supply unit 34 for connection by an electric lead cable 35 to a main electrical supply and having further electrical lead connections 33, 6, 45 to the illusion apparatus 19, the motor unit 32 and the instructor's control box 39 respectively.

To derive from the pupil's movements of the car pedals the necessary signals for control of the equipment, a pedal board 42 is laid on the floor or footboard of the car 11 in the region of the pedals. Rotatably mounted on the pedal board 42 is an assembly comprising three coaxial metal tubes 46, 47, 59 (FIGURE 3) nested together and of different lengths, the outermost tube 59 being the shortest and the innermost tube 46 the longest, so that there is external access to each tube at both ends. When the pedal board is in position the common axis of the tubes is horizontal and runs transversely. At one end each of the three tubes 46, 47, 59 carries a radial arm 49, 50, 51 respectively to engage respectively the accelerator, brake and clutch pedals of the car. The arms 50, 51 bear against the undersides of the brake and clutch pedals, while the arm 49 embodies a flat plate to overlie the accelerator pedal, and each is provided with a light return spring to keep it in contact with its respective pedal.

The arm 49 engaging the accelerator pedal operates a connecting rod 55 through its tube 46, which rod in turn rotates the wiper arm of a multi-contact sequence switch 57 through gearing 56. The sequence switch has an electric lead connection 58 that extends to the power unit 34 and serves to regulate the speed of the motor in the unit 32 in accordance with the degree of depression of the accelerator pedal. The lead cable 58, along with a further electric lead connection 48 yet to be mentioned, are shown combined in FIG. 2 as one lead cable 43.

The arm 51 is arranged to operate, at the point in the clutch pedal travel at which the clutch begins to engage, a miniature electric switch 54 connected by the electric lead 48 to the power unit 34. Depression of the clutch pedal by the pupil driver illuminates a clutch indicator sign on the instructor's control box and causes the simulated gearbox to go into neutral in that the motor drive to the illusion apparatus 19 is disconnected. If the motor has been driving, however, a flywheel in the unit 32 will keep the illusion apparatus running, in simulation of travel of the car with the clutch disengaged as in normal driving, unless the brake pedal is also depressed.

Depression of the brake pedal in the car causes the arm 50 to operate, through a mechanical sheathed cable 44 having a connection 52 to the tube 47, a mechanical brake in the motor unit 32 to slow up the illusion apparatus.

The pedal board arrangement shown in FIGURE 3 is best suited to cars in which the control pedals are of the pendant type. The arms of the pedal board can, if desired, be made adjustable to suit pedal arrangements in different cars and the position of operation of the clutch switch is likewise adjustable to match the clutch pedal free travel of the car in use.

A speedometer 40, placed in the car 11 where both the pupil driver and the instructor can see it, is driven by a mechanical sheathed cable drive 41 from the simulated gearbox to show simulated speed. To simulate car engine noise the electric motor in the unit 32 drives an electromechanical noise generator which produces, after amplification in the power unit 34, a synthetic car engine noise signal that is fed by an electric lead 37 to a loudspeaker 38 placed under the car 11.

The simulated gear box has four incremental ratios of drive speed from the electric motor to the illusion apparatus 19 to represent the four forward speeds of a conventional car gearbox; a reverse drive is also provided. Any of the four forward speeds can be selected by the instructor by operation of one of four push buttons 64 on the instructor's control box 39, and reverse is given by a fifth button 65. The control box 39 also bears an "ignition" switch 60 and a "starter" button 61. The "ignition" switch 60 must be operated before the drive motor will start but the motor does not actually begin to run until the "starter" button 61 is thereafter depressed. All these instructor's box controls are manipulated by the instructor to match the operations of the actual car controls that he observes the pupil driver to be effecting. The instructor can bring about simulation of a stalled engine condition by flicking the "ignition" switch 60 off and then on again.

In addition, the instructor is provided with a main switch 63 for the equipment and an "emergency stop" button 62. The "emergency stop" button 62, when operated, causes a stop instruction signal to flash on the screen in front of the pupil. It may be used in conjunction with a reaction timer 71 that plugs into the power unit 34 and gives an indication of the time that elapses from the instant at which the button 62 is depressed to that at which the pupil begins to brake.

The roads of the model layout on the disc 26 are everywhere bounded by electrified contact wires 36 representing the curbs. When the supposed motion of the car carries its wheels over the simulated curb of the roadway displayed in the projected scene, the metal housing of the projection lamp 25 makes contact with one of the wires 36 and this closes an electrical circuit that energises a buzzer type audible warning device associated with the instructor's control box 39.

The arrangement of the electrical circuitry of the equipment is shown in detail in FIGURE 5.

The equipment described enables a pupil driver to familiarise himself with car controls and to obtain practice in the manipulation and coordination, under realistic conditions of simulated road handling, of the controls of the actual car he is to drive before he takes the vehicle on the road.

Modifications of the particular arrangement described are possible without departing from the scope of the invention. Thus, information, such as steering deflection, that in the above equipment is transmitted mechanically can instead be electrically transmitted. The spring centering of the steering can be effected by rubber elements in appropriate cases.

It is also possible to arrange for selection of the ratios in the simulated gearbox to follow automatically upon operation by the pupil of the gear lever and clutch. This entails an operative connection to the gear lever of the car. However, while such an arrangement is feasible it will normally be ruled out by economic considerations.

We claim:

1. Driving training apparatus to be used in conjunction with an actual but stationary motor vehicle comprising; a visual illusion apparatus to project onto a screen in front of the vehicle a moving picture of terrain through which the vehicle is supposedly passing and which picture can behave appropriately in response to a pupil's operation of the controls of said stationary vehicle; and two wheel-supporting shoe assemblies to receive the two front wheels of the vehicle, the shoe assemblies being each mounted for turning with the wheel about an upright pivot and on independent bases that are capable of being moved towards and away from one another to vary the separation between the shoe pivot axes, whereby the angular movements of the shoe assemblies represent steering deflection angle information that is transmitted to the visual illusion apparatus.

2. Equipment according to claim 1, wherein at least one of the shoe assemblies is spring-biassed toward the "straight ahead" position to simulate the steering wheel centering action in an actual vehicle in motion.

3. Equipment according to claim 1 wherein each shoe assembly is carried by a rotary head that is pivotally mounted on the respective base, and the shoe assembly is laterally adjustable across the rotary head to change its position relative to the pivot axis.

4. Equipment according to claim 1 and wherein by the use of electrical contact elements bounding model roads in the illusion apparatus a warning device is energised when the pupil "fouls the curb" as a result of the simulated vehicle motion produced by his handling of the vehicle.

5. Equipment according to claim 1 and comprising signal pick-off means to be positioned in the vehicle in association with the control pedals thereof and arranged to transmit control signals to the visual illusion apparatus in accordance with the pupil's operation of the control pedals.

6. Equipment according to claim 5 wherein the visual illusion apparatus has a drive connection from a unit that embodies an electric drive motor and simulates a vehicle engine and gearbox, and the signal pick-off means provides a control signal bringing about variation in the speed of the drive motor in accordance with the pupil's operation of the accelerator pedal of the vehicle.

7. Equipment according to claim 6, wherein the signal pick-off means provides a control signal bringing about braking of the drive from the motor unit to the illusion apparatus in accordance with the pupil's operation of the brake pedal of the vehicle.

8. Equipment according to claim 6 comprising a speedometer to be placed in the vehicle, and a drive connection thereto from the simulated gearbox of the motor unit, to indicate simulated speed.

9. Equipment according to claim 6 wherein the motor unit drive to the illusion apparatus has a number of incremental speed ratios in simulation of a vehicle gearbox, and the instructor's control unit is provided with controls to select these ratios and operable by the instructor in accordance with his observation of the use made by the pupil of the actual gear shift of the vehicle.

10. Equipment according to claim 9, wherein the instructor's control unit is provided with a control operable by the instructor to produce on the screen a visual emergency stop instruction to the pupil.

11. Stationary vehicle-driving training equipment, comprising a pair of spaced shoes to receive the front steerable wheels of an automobile, each shoe having independent mounting means comprising a base, a rotary head mounted to turn on the base about an upright pivot axis, and guides on the rotary head upon which the shoe is mounted for adjustment across the head to change its position relative to the pivot axis, with spring means acting on at least one of the rotary heads to bias the associated shoe toward a predetermined angular position, visual illusion apparatus comprising a screen placed so that it is in front of an automobile parked with its front wheels in the shoes and means to project on to the screen a moving picture of terrain through which the automobile although stationary is supposed to be passing, and signal transmission means to transmit to said projection means of said visual illusion apparatus control signals representing information concerning the operation of the controls of such parked automobile by a pupil driver seated in the driver's seat thereof whereby the moving picture will be caused to behave appropriately in response to such operation of said controls, said signal transmission means including an operative connection between said shoes and said projection means transmitting a steering wheel deflection angle information signal.

12. Driving training apparatus to be used in conjunction with an actual but stationary motor vehicle to be controlled by the pupil comprising; visual illusion apparatus to project on to a screen in front of said vehicle a moving picture of the terrain through which said vehicle is supposedly passing and which can behave appropriately in response to a pupil's operation of the controls of said stationary vehicle; instructor's control means for monitoring and selectively actuating said visual illusion apparatus; and means responsive to the pupils control of said vehicle for selectively actuating said visual illusion apparatus, whereby control signal information for controlling said illusion apparatus is derived in part directly from the movements of the vehicle controls made by said pupil and in part from said instructor's control unit, said unit having controls operable by a human instructor keeping the pupil's actions under observation.

13. Driving training apparatus to be used in conjunction with an actual but stationary motor vehicle comprising; visual illusion apparatus to project onto a screen in front of said vehicle a moving picture of the terrain through which the vehicle is supposedly passing and which can behave appropriately in response to a pupil's operation of the controls of said stationary vehicle; at least one wheel-supporting shoe provided to receive a steerable wheel of the vehicle and which is mounted for turning about an upright pivot when the steering wheel is operated, the angular movements of the shoe representing steering deflection angle information that is transmitted to the visual illusion apparatus; signal pick-off means to be positioned in the vehicle in association with the control pedals thereof and arranged to transmit control signals to said visual illusion apparatus in accordance with the pupil's operation of said control pedals, said signal pick-off means comprising, an assembly of independently rotatable nested coaxial tubes of different lengths to lie in the vehicle with their common axis extending transversely thereof, each tube having a radial arm to bear on and follow the movements of a different one of said vehicle control pedals.

14. Driving training apparatus to be used in conjunction with an actual but stationary motor vehicle comprising; visual illusion apparatus to project on a screen in front of the vehicle a moving picture of terrain through which the vehicle is supposedly passing and which can behave appropriately in response to a pupil's operation of the controls of the stationary vehicle; at least one wheel supporting shoe provided to receive a steerable wheel of the vehicle and which is mounted for turning with the wheel about an upright pivot when the vehicle steering is operated, the angular movements of the shoe representing steering deflection angle information that is transmitted to the visual illusion apparatus; signal pick-off means to be positioned in the vehicle in association with the control pedals thereof and arranged to transmit control signals to said visual illusion apparatus in accordance with the pupil's operation of the controls; said visual illusion apparatus having an electrical drive motor unit simulating the vehicle engine and gear box whereby control signals emanating from said signal pick-off means are operative to bring about a variation in the speed of said drive motor in accordance with the pupil's operation of the accelerator pedal and a disconnection of the motor drive from the illusion apparatus upon depression of the clutch pedal of the vehicle.

References Cited in the file of this patent

UNITED STATES PATENTS

| 2,046,202 | Miles | June 30, 1936 |
| 2,627,674 | Wilson | Feb. 10, 1953 |
| 2,742,714 | Allgaier | Apr. 24, 1956 |

FOREIGN PATENTS

| 452,735 | Great Britain | Aug. 28, 1936 |